(12) United States Patent
Hawkins et al.

(10) Patent No.: US 10,919,345 B2
(45) Date of Patent: Feb. 16, 2021

(54) VIBRATION SUPPRESSION TIRE

(71) Applicant: ACOUSTIC INNOVATIONS CO., LTD., Fuchu (JP)

(72) Inventors: Sanford Elliot Hawkins, New York, NY (US); Ippei Soma, Fuchu (JP)

(73) Assignee: ACOUSTIC INNOVATIONS CO., LTD.

( * ) Notice: Subject to any disclaimer, the term of this patent is extended or adjusted under 35 U.S.C. 154(b) by 472 days.

(21) Appl. No.: 15/523,443

(22) PCT Filed: Oct. 30, 2014

(86) PCT No.: PCT/JP2014/078991
§ 371 (c)(1),
(2) Date: May 1, 2017

(87) PCT Pub. No.: WO2016/067434
PCT Pub. Date: May 6, 2016

(65) Prior Publication Data
US 2017/0313139 A1    Nov. 2, 2017

(51) Int. Cl.
*B60C 19/00* (2006.01)
*B60C 1/00* (2006.01)
(Continued)

(52) U.S. Cl.
CPC .............. *B60C 19/00* (2013.01); *B60C 5/00* (2013.01); *B60C 5/12* (2013.01); *B60C 19/002* (2013.01); *B60C 1/00* (2013.01)

(58) Field of Classification Search
CPC ......... B60C 1/00; B60C 19/00; B60C 19/002; B60C 19/003; B60C 19/12; B60C 19/122
See application file for complete search history.

(56) References Cited

U.S. PATENT DOCUMENTS 4,357,393 A * 11/1982 Tsuda ................ B22F 7/002
428/547
2004/0103967 A1    6/2004 Majumdar et al.
(Continued)

FOREIGN PATENT DOCUMENTS

EP    0133876 A2    3/1985
FR    1399709 A    5/1965
(Continued)

OTHER PUBLICATIONS

Machine translation of JP 2013-052858, 2013.*
Extended European Search Report for EP Application No. 14905152.6, dated May 4, 2018 (7 pages).

*Primary Examiner* — Justin R Fischer
(74) *Attorney, Agent, or Firm* — Harness, Dickey & Pierce, P.L.C.

(57) ABSTRACT

A vibration absorbed tire is provided which has a laminated structure that contains dilantant layer causing reaction rate differences in the cross-sectional direction and thus functions without impairing the motion characteristics of the tire even with only a single or a few very thin layers, whereby the tire is easy to manufacture and has reduced cost. The tire has the laminated structure, which includes the dilantant layer which is a layer where particles and a bonding material thereof are arranged to act as dilantant, and in which the particles are arranged so that the distribution density of the particles decreases toward the upper and the lower surface from the central part of the layer.

19 Claims, 14 Drawing Sheets

(51) Int. Cl.
 *B60C 5/00* (2006.01)
 *B60C 5/12* (2006.01)

(56) References Cited

U.S. PATENT DOCUMENTS

| | | |
|---|---|---|
| 2011/0259498 A1 | 10/2011 | Pagano et al. |
| 2014/0246133 A1 | 9/2014 | Lamontia et al. |
| 2017/0051134 A1 | 2/2017 | Yamagishi |

FOREIGN PATENT DOCUMENTS

| | | |
|---|---|---|
| FR | 2939724 A1 | 6/2010 |
| JP | H11-115406 A | 4/1999 |
| JP | H11-245611 A | 9/1999 |
| JP | 2005-104314 A | 4/2005 |
| JP | 2005-349960 A | 12/2005 |
| JP | 2012-512090 A | 5/2012 |
| JP | 2013-052858 A | 3/2013 |
| JP | WO-2015-166997 A1 | 11/2015 |

\* cited by examiner

Figure 7

| Index | Speed | Load | Tire Pressure | Embodiment 1 | Tire with Identical Weight Rubber Attached | Normal Tire |
|---|---|---|---|---|---|---|
| unit | km/h | N | kPa | °C | °C | °C |
| 1 | 36 | 2600N | 2.2 | 28 | 29.8 | 29.8 |
| 2 | 72 | 2600N | 2.2 | 29.9 | 32.7 | 32.6 |
| 3 | 108 | 2600N | 2.2 | 31.5 | 34.9 | 34.9 |
| 4 | 80 | 5254N | 2.2 | 32.1 | 36.4 | 36.4 |

VIBRATION SUPPRESSION TIRE

CROSS-REFERENCE TO RELATED APPLICATIONS

This application is a U.S. National Phase Application under 35 U.S.C. 371 of International Application No. PCT/JP2014/078991, filed on Oct. 30, 2014 and published in Japanese as WO/2016/067434 on May 6, 2016. The entire disclosures of the above applications are incorporated herein by reference.

BACKGROUND

Technical Field

The present disclosure relates to a tire which has an absorbing structure to reduce vibration and improve the riding comfort of a vehicle, and a manufacturing method thereof.

Background Art

Tires of a vehicle will generate vibration when driving on a road. This vibration is produced by excitation of the construction chain from tire to the vehicle chassis from tire deformation caused by the contact of the tire with the road surface. As this tire vibration substantially reduces the riding comfort of the vehicle, car and tire manufacturers spend significant time and resources to reduce tire vibration into the vehicle chassis.

FIG. 1 is the sectional concept view of a conventional tire. Transmission of vibration from the tire to the chassis is by the tire structure being excited by road contact and the resulting vibration transmitted to the chassis through the wheel 12, the shaft, and the suspension system.

The tire deformation by the impact between tire and road surface started from the contact patch of tread 13 and will then deform and vibrate the "sidewall" 14 (the side portion of tire) and finally transmitted to wheel 12 as well as the inner tire cavity 11.

There is a conventional art to absorb this vibration which is to provide a structure to effectively absorb the deformation caused by the impact between tire and the road surface. Japanese Unexamined Patent Application Publication No. 2013-52858 is cited as the above conventional art.

Japanese Unexamined Patent Application Publication No. 2013-52858 is the art to effectively absorb the deformation caused by the impact between tire and road surface by disposing a laminated structure composed with the layer where the arrangement of particles and binder acts as a dilatant and utilizing the nature of the dilatant, where "a material will act as a fluid when applied with small shear stress and when applied with a large shear stress, the material will act as a solid".

However, when the laminated structure is very thin (less than 2 mm), Japanese Unexamined Patent Application Publication No. 2013-52858 requires a very difficult manufacturing process of bonding very thin laminate sheets evenly and flat. The process was unable to meet the development requirement to attain the effect by using thinner and lighter sheets. Furthermore, a laminated structure composed of a single dilatant layer may cause an adverse effect on the dynamics characteristics of the tire. This is caused by that the embodiment of Japanese Unexamined Patent Application Publication No. 2013-52858 does not have the characteristics to generate a cross sectional difference in reaction speed in the dialantant layer within the laminated structure. This characteristic will cause the reaction speed of the dilantant layer at the excitation by the contact and separation between tire and road surface to be uniform in cross sectional direction. This will over damp the tire structure during road contact and obstruct the smooth deformation of the tire.

For the above reasons, the object of the present disclosure is to provide a vibration reduced tire at low cost and simple to manufacture by composing a dilantant layer with the characteristics for generating a cross sectional difference in reaction speed in the laminated structure, thus the laminated structure will function without harming the tire dynamics characteristics even if it is only composed of a very thin single layer or a few layers.

SUMMARY OF THE INVENTION

In order to realize the object, the present embodiment firstly developed a laminated tire absorber structure composed of a laminated structure composed of a variable density dilantant layer where the arrangement of particles and its binder acts as a dilantant, and where the particles are arranged so that the density distribution of the particles decreases toward the upper and the lower surface from the central part of the layer. This embodiment provides a vibration absorbed tire with the characteristics for generating a cross sectional difference in reaction speed in the laminated structure.

In addition to above characteristics, the present embodiment secondly developed a tire in which the laminated structure is composed with a binder layer(s) with elasticity on the upper and/or the lower stratum of the dilantant layer, and the binder layer(s) bonds said dilantant layer to the other member(s) so as to protect said dilantant layer. This protects the dilantant layer and the vibration absorbing effect can be enhanced.

"Dilantant" is a mixture which has the characteristics to act as a fluid when applied with small shear stress and act as a solid when applied with a large shear stress. This mixture is classified as a kind of non-Newtonian fluids.

The present disclosure with above configuration will provide a vibration absorbed tire with the characteristics for generating a cross sectional difference in reaction speed in the laminated structure, thus will provide a vibration absorbed tire which will not obstruct the smooth deformation of the tire using a thinner and lighter laminated structure which may be constructed out of a single layer or a few layers.

BRIEF DESCRIPTION OF THE DRAWINGS

FIG. 7 is test result which shows the relationship between the tire according to the present disclosure and the heat reduction.

DETAILED DESCRIPTION

Following is the detailed description of exemplary embodiments of the present invention. The mutual relation between the exemplary embodiments and the claims are below. Embodiment 1 is mainly related with claim 1, embodiment 2 is mainly related with claim 2. Yet, the present invention will not be limited within those embodiments and shall be put into practice at variable embodiments within extent of its substance.

Embodiment 1

Figure 1:
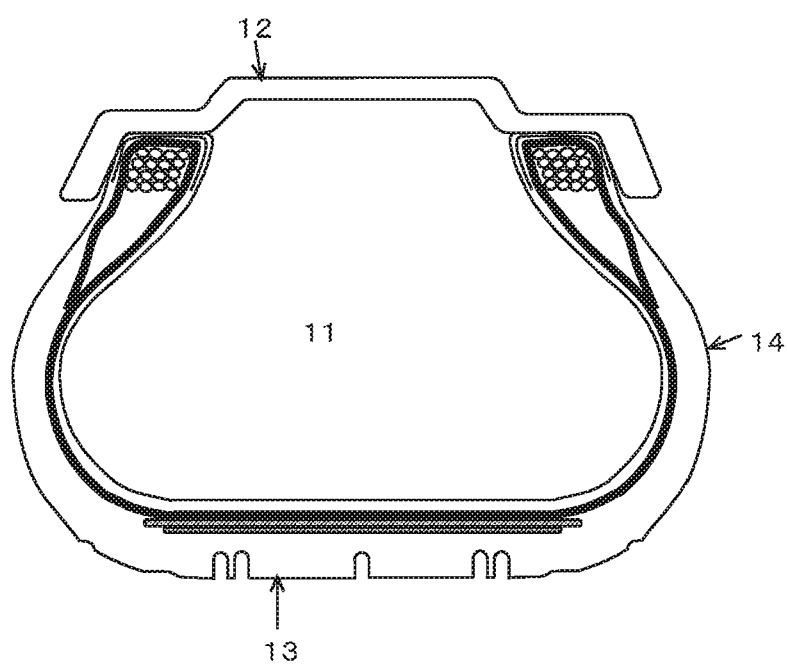
FIG. 1 is a cross sectional concept view illustrating a typical tire.
Figure 2:
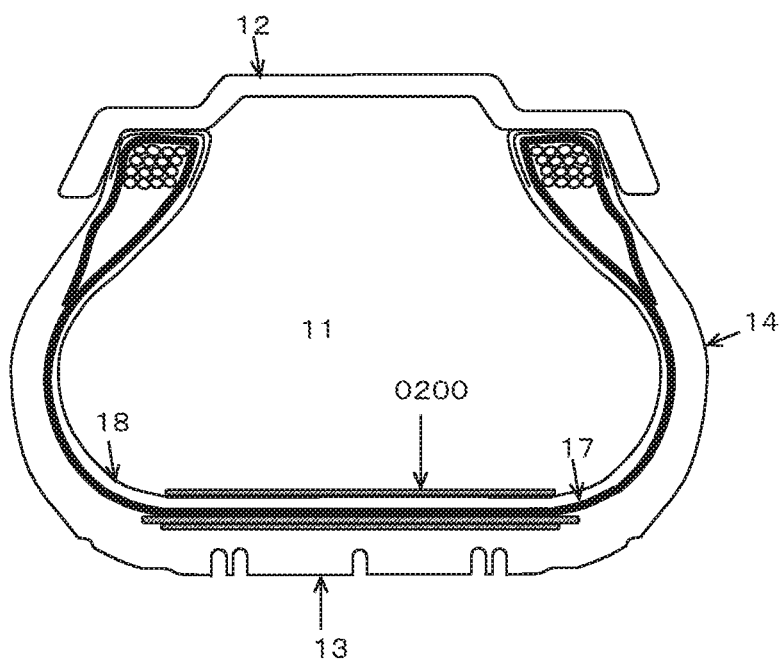
FIG. 2 is a cross sectional concept view illustrating a tire of embodiment 1.
Figure 3:
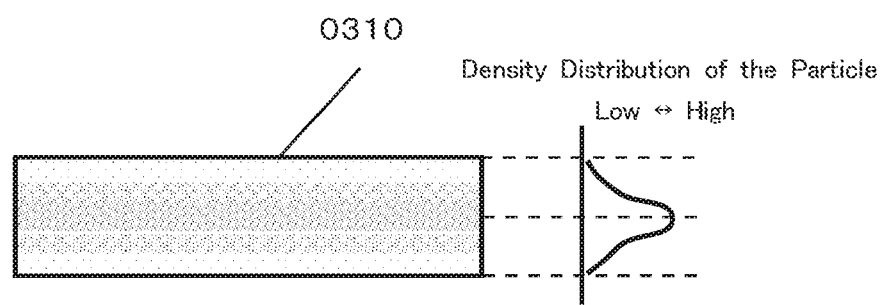
FIG. 3 is a concept view showing the simplest example of composition of the laminated structure of embodiment 1.

The tire of this embodiment is featured by being composed with a laminated structure which is composed with a dilantant layer, which is a layer where the arrangement of particles and its binder acts as a dilantant, and where the particles are arranged so that the density distribution of the particles decreases toward the upper and the lower surface from the central part of the layer.
Composition of the Invention FIG. 1 is showing the cross sectional concept view of a general tire, and FIG. 2 is a concept view of the tire in embodiment 1. The difference between two is the presence or absence of the laminated structure (0200). FIG. 3 is showing the simplest exemplary composition of laminated structure.

The laminated structure (0200) in the FIG. 2 is composed on the tire inner surface (18). Also, as shown in the FIG. 3, the laminated structure (0200) is composed with a single dilantant layer in where the particles are arranged so that the density distribution of the particles decreases toward the upper and the lower surface from the central part of the layer.

Below is an example of the structure and the material of the particles and the binder of the dilantant layer.

"Dilantant layer" (0310) is a layer where the arrangement of particles and its binder acts as a dilantant. "Act as a dilantant" means showing the characteristics of acting as a fluid when applied with small shear stress and acting as a solid when applied with a large shear stress.

The dilantant layer can be composed of inorganic oxide particles like alumina or silica but the device is not limited to these. The exemplary form of the present embodiment uses 1 μm to 10 μm alumina particles to provide good vibration absorption. These particles are commercially available at sizes of 1 μm to 100 μm. Currently, alumina particles sizes larger than 1 μm from 10 μm are not preferred since the excessive size of the particle dispersed within the binder can cause the damage to the surface of mixer or roller during kneading of the mixture.

The binder composing the dilantant layer should have the strength to support the particles but should also have the elasticity to prevent distortion and irreversible damage to the laminated structure when experiencing deformation of the tire during rotation. It should have a small molecular size and a low surface tension to enable it to flow into the gap between the particles. The examples of binder with those characteristics can be a polymer compound like rubber, paint, adhesive, and glue, but not limited to these.

Figure 4:
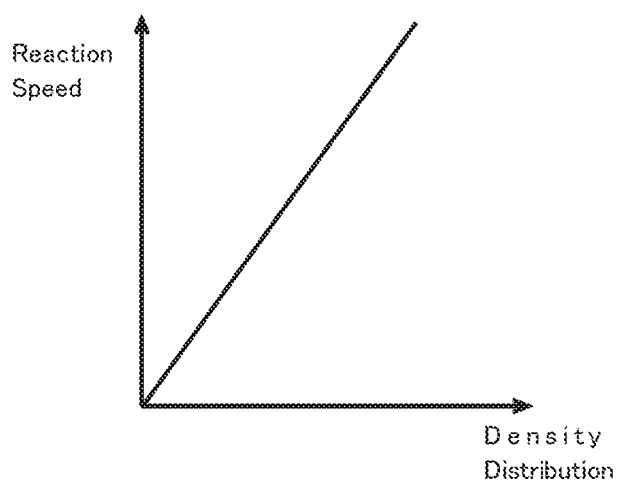
FIG. 4 is a graph of the relationship between the particle density and dilantancy reaction speed.

It is desirable that the cross sectional particle density distribution of dilantant layer is given a characteristic to have the characteristic to create an effect to absorb the vibration without obstructing the smooth deformation of the tire by the dilantant layer itself. In this regard, FIG. 4 shows the relationship between the particle density and reaction speed of the dilantancy. The higher the particle density is, the faster the reaction speed of the dilantancy becomes, while the lower the particle density is, the slower the reaction speed of the dilantancy becomes. Due to this, if the particle density is uniform within the dilantant layer, the whole dilantant layer will simultaneously react to tire deformation, which rapidly increases the viscosity and creates rebound force. It is thus not possible to appropriately reduce the vibration, and therefore, it is not possible to absorb the vibration by the laminated structure alone without obstructing the smooth deformation of the tire. To solve this problem, the dilantant layer of the tire according to the present disclosure has sections of variable particle density toward the upper and the lower surface from the central part of the layer, because "the particles are arranged so that the density distribution of the particles decreases toward the upper and the lower surface from the central part of the layer". Using this arrangement, the tire according to the present disclosure will demonstrate the vibration absorption effect without obstructing the smooth deformation of the tire as it will not harm the elasticity which a tire will need to deform right at the road surface impact or dispatch because the reaction speed of dilantancy at the deformation will decrease toward the upper and the lower surface from the central part of the layer and the viscosity will progressively increase as it separates from the central part so as to absorb the vibration.

The exemplary form of the present embodiment of "the particles are arranged so that the density distribution of the particles decreases toward the upper and the lower surface from the central part of the layer" includes not only the case that the density distribution dropping rates to the upper and lower surface are equal but also the dropping rate is controlled differently at each direction in consideration of effect of centrifugal force during vehicle driving. The said centrifugal force will be larger at outer side of the tire than at inner side.

Figure 5:
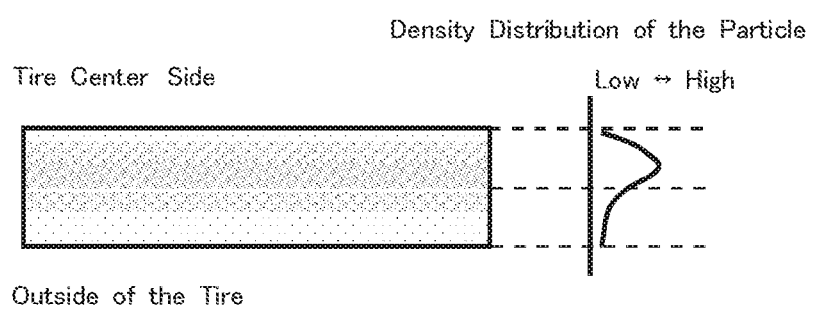
FIG. 5 is the drawing No.1 which shows more preferable density distribution.

The example for the later form is described as, as shown in FIG. 5, the density distribution tends to be set higher towards inner side of the tire at the static state in consideration of alumina particles move to outer side of the tire by the centrifugal force during driving. This composition may allow the dilantant layer to be equal in drop rate of the density distribution to the upper and lower surfaces from central part of the layer by the influence from centrifugal force during driving. Thus, the said laminated structure will absorb the vibration caused by contact with road surface during driving effectively. (The manufacturing method will be described later.)

Figure 6:
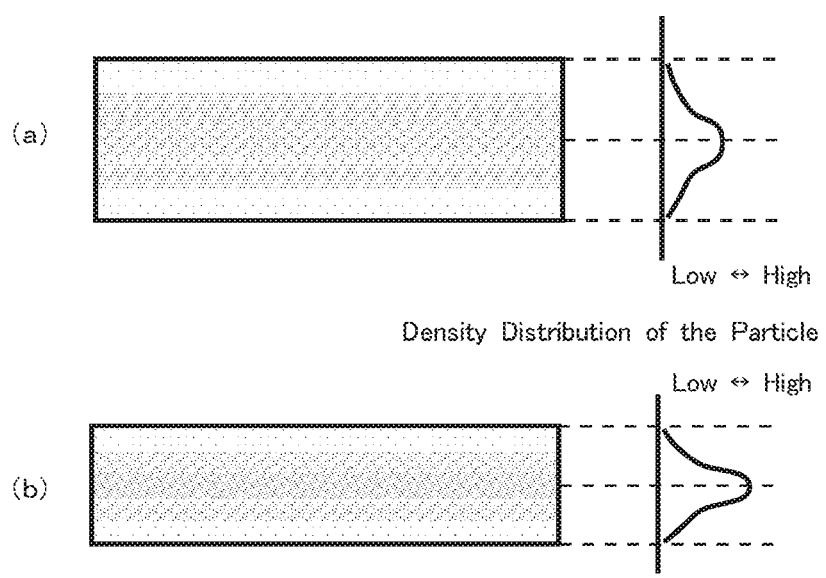
FIG. 6 is the drawing No.2 which shows more preferable density distribution.

Furthermore, a specific example is to set the density distribution at the static state to demonstrate the best effective absorption under centrifugal force of focused speed, which is most desirable to show the effect, as shown in FIG. 6, where the density distribution varies by being pressurized by the centrifugal force during driving. (a) in the FIG. 6 shows density distribution status at static condition and (b) shows the density distribution at desirable speed to have the best absorption performance. If the density distribution at the condition (b) is suitable, it is possible to set the static state density distribution to be comparably less as in (a). This way, it is possible to set the density distribution to show the best absorption performance at the most desirable driving speed to apply it.

The specific gravity of alumina particles when using rubber as the base material is desired to be within the range in which the dilantant layer effectively performs the dilantancy without losing the strength of the layer. When using 4 μm-5 μm diameter alumina particles within the base material of rubber, it is possible to effectively show the dilantancy without losing the strength of the layer by dispersing the alumina particles into the rubber to form a dilantant layer of 1.5-3.0 specific gravity.

Furthermore, in the case using 4 μm-5 μm diameter alumina particles dispersed within the base material of rubber so as to form the layer at 2.0-2.5 specific gravity, it is possible to more effectively show the dilantancy without losing the strength of the layer. Therefore, the specific gravity of the dilantant layer when using rubber as the base material and alumina particles is better to be 1.5 to 3.0 and is more desirable to be 2.0 to 2.5 but not limited to these.

The thickness of the laminated structure is desirable to be between 1/100 to 1/10 of the thickness of the tire tread in order to perform effective vibration absorption and to save the weight. Nevertheless, this suitable thickness shall be properly selected according to different conditions such as tire sizes (general passenger cars, large trucks, construction vehicles, aircrafts or the like) operating speeds (normal passenger cars, F1 vehicles, aircrafts or monorails), and shock applied to the tire (normal passenger cars, off-road cars, or aircrafts).

The degree of dilantancy performance can be varied according to the particle material, volume, size, shape and density, to selected material, elasticity and density of binder. Furthermore, at the rotating state, the thickness of the said dilantant layer would be reduced from the static state, as it will be pressurized by the load of tire air pressure and by the load of the centrifugal force generated by tire rotation. This will also vary the relative composition between particles and binder and will change the degree of dilantancy efficiency.

The particle shape and structure can be unlimited. For example, the particle can be hollow structure and this hollow structure can contain non-newtonian fluid or polymer compound or polar solvent. These ingredients can enhance the vibration absorption effect by absorbing the internal kinetic energy of the particles when receiving stress. As a further example, the particles can be round or some other geometric shape, such as faceted sphere, for greater packing density and it is possible to control the dilantancy effectiveness by selecting a particle which have specific shape and structure.

As written above, "a laminated structure" is composed of the dilantant layer(s) in which particles and binder are arranged to act as a dilantant, but it does not have to be composed of dilantant layer(s) only but also it is possible to have other layers at upper and/or lower stratum of the dilantant layer and in between the dilantant layers.

Said laminated structure can further include a binder layer or layers with elasticity on the upper and/or the lower stratum of the dilantant layer and the binder layer(s) bonds said dilantant layer to the other tire or device members (including other dilantant layers) so as to protect said dilantant layer (details will be describe in embodiment 2).

The adhesion between dilantant layer and binder layer, and between tire inner surface and the laminated structure can be achieved by selecting material of binder and binder layer martial that is an adhesive or a paint or elastic material which has an adhesive characteristic or be a material which will be glued by the thermal reaction during the vulcanization but this is not limited to these. One of the binders to form a layer could consist of a material that will act as a stop leak for punctures.

Said laminated structure can be located on the tire tread surface (bottom section and/or side section of the tread grooves), or within of tire construction or on the tire inner surface (the surface of reversal side of tire tread and the inner tire surface which is adjacent to tire air cavity). It will work better to absorb the vibration when composed on the tire inner surface.

Said laminated structure will show sufficient vibration absorption performance when composed with a single dilantant layer.

Said laminated structure will work as a vibration damping member to the rapid deformation caused by the tire contact with or tire dispatch from the road surface.

Description about the Effect of the Dilantant Layer

Below is the description about the effect of the dilantant layer during driving on a road.

When not receiving rapid excitation by the tire contact with or tire separation from the road surface, the particles within the dilantant layer are easy to rub against each other by being pressurized by the force of inner tire air pressure and by the centrifugal force from the inner side of the tire. This includes not only directly contacting each other but also indirectly rubbing each other with mediation of the binder. Under these conditions, the dilantant layer acts as a liquid and transforms the kinetic energy of the particles to thermal energy as the circulating vibration originated from road contact shockwave deform it and the particles rub each other. The vibration circulating through the whole tire structure will be absorbed by this transformation from kinetic energy into thermal energy.

When the tire receives a rapid excitation from the tire road contact, the tread will rapidly deform and generate to the laminated structure a reversal force against the air pressure and the centrifugal force which said laminated structure constantly received beforehand. By rapidly unloading from these forces, the dilantant layer will act as a solid under large stress, which means "express dilantancy", thus will obstruct deformation and vibration. However, it will harm the tire smooth deformation and harm the tire dynamic characteristic if the dilantant layer obstructs the deformation itself at the road contact and release, thus the dilantancy appearance should be controlled to be progressive, so as to have time lag, across the cross sectional direction by altering the cross sectional granular density and/or by employing multi-layer structure. By this effect, the laminated structure will have a function to locally and selectively damp the excitation of the tire caused by the shock by the deformation. By featuring said function, the laminated structure will work as a mass damper to stabilize tire shape. Said mass damper means generally weighed member to be disposed into tire to damp the tire vibration. That is to say, said a laminated structure can reduce tire vibration without harming tire dynamic performance.

After deformation by the excitation from the tire road contact, the laminated structure instantly becomes loaded by constant tire air pressure and centrifugal force and returns to the former liquid state from the temporary solid state and continuously absorbs the vibration by the particle jostling each other. When the tire road release starts, the tread rapidly recovers, and then, a reversal force to the tire air pressure and the centrifugal force will be rapidly applied to the laminated structure. At this point, similar to the case of the tire road contact, the laminated structure reduces tire vibration without harming tire smooth deformation by the effect of proper dilantancy appearance provided by the cross sectional feature within.

Furthermore, the particles within the laminated structure will be pushed and pulled each other in vertical and horizontal directions while repeating above written process. The total tire vibration will be damped as kinetic energy will be transformed to thermal energy by hysteresis loss within the binder located between particles that are being compressed and released by the above described forces.

FIG. 7 is the test result in temperature reduction effect of the tire according to the present disclosure. The temperature at the bottom of the second groove from outside edge of the tire was measured and compared under the condition written on the chart and under inside temperature of the tire tester being set to 25 C. The laminated structure composed at inner tire surface was a 0.6 mm single layer sheet made of rubber and alumina particles with the specific gravity of 2.6. The size of tire used was 215/50/R17.

With the present disclosure applied, a reduction at the tire tread surface temperature of about 1.8 C from the normal tire or from the tire with the same weight rubber sheet attached was observed under the condition of 2600N load and 36 km/h speed. Also, at 72 km/h speed, a reduction at the tire tread surface temperature of about 2.7 C from the normal tire or from the tire with the same weight rubber sheet attached was observed. Furthermore, at 108 km/h speed, a reduction at the tire tread surface temperature of about 3.5 C from the normal tire or from the tire with the same weight rubber sheet attached was observed. Additionally, under 5254N load at 80 km/h speed, a reduction at the tire tread surface temperature of about 4.3 C from the normal tire or from the tire with the same weight rubber sheet attached was observed.

These effects are conceivable that the reduction of the hysteresis loss caused by absorption of tire tread surface vibration limits the temperature increase. Also, this temperature reduction effect is shown even if the tire deformation is large under a heavy load such as demonstrated by the tire rolling resistance measurements.

As described above, the laminated structure shows the effect of absorbing the vibration and limiting the tread temperature increase while the rotating tire repeatedly contacts and releases from the road surface. Also, said laminated structure minimally increases the total tire weight and the total tire manufacturing cost, as it is very efficient at lightweight and made of common low cost materials.

Manufacturing Methods

Two exemplary manufacturing methods of the tire according to the present disclosure are given below.

(1) Construct the laminated structure into a sheet by kneading together and then cooling down a binder, such as rubber, and particles, such as alumina.

(2) Construct the laminated structure by injecting particles into the inside and/or outside surface of the tire after vulcanization.

Since the former is the basic manufacturing method, the former will be described as the "basic manufacturing method" and the latter will be described as the "applied manufacturing method".

Basic Manufacturing Method

Figure 8:
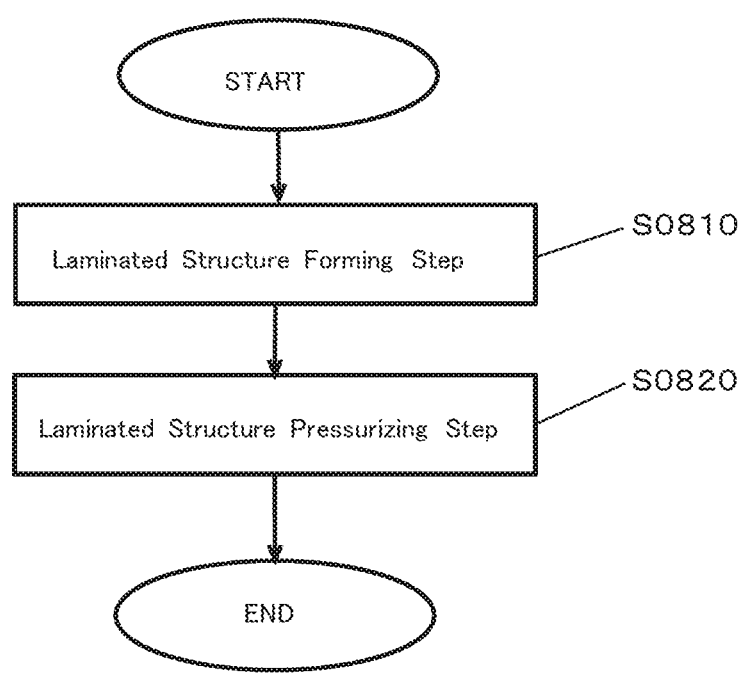
FIG. 8 is a flow chart of the manufacturing method of embodiment 1.

FIG. 8 is the flow chart which shows an exemplary tire manufacturing method of the present disclosure. First of all, form the laminated structure including a dilantant layer(s), which is a layer where particles and binder are arranged to act as a dilantant. (This is shown in S0810 Laminated structure forming step.) Second, dispose the laminated structure to tire inner surface or to the tire section close to inner surface by heating and pressurization procedure. (This is shown in S0820 Laminated structure pressurizing step.)

Specifically, the Laminated structure forming step (S0810) passes through following processes.

Figure 9:
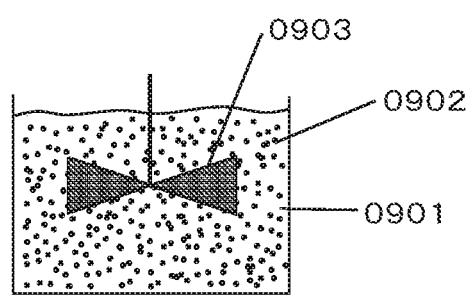
FIG. 9 is a drawing which shows the kneading of the manufacturing process.

FIG. 9 is a view of kneading with a mixing tool (0903) using rubber (0901) as the binder and alumina (0902) as the particles. The alumina particles disperse into raw rubber material uniformly by mixing with the mixing tool.

Here, the mixing tool is used, but any tool that can properly knead rubber and alumina, a mixing roller may be used instead of the mixing tool.

Figure 10:
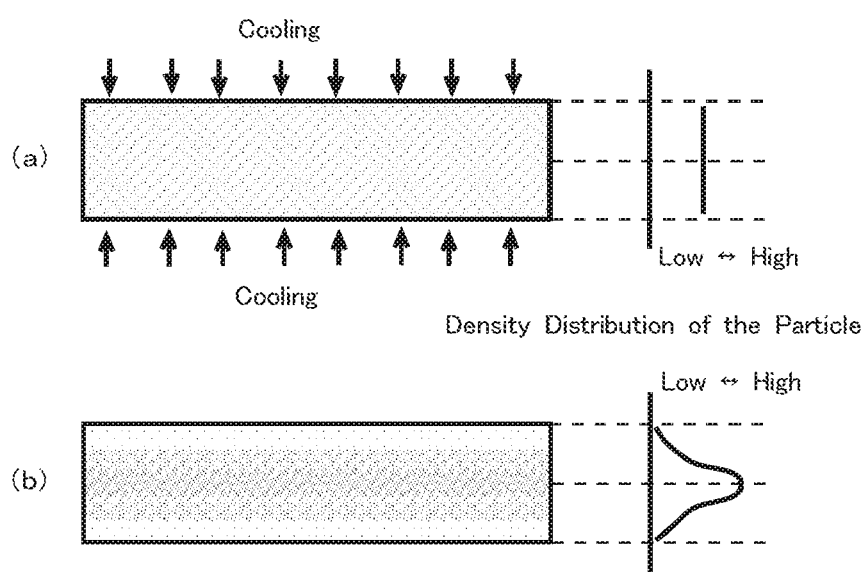
FIG. 10 is a drawing which shows the cooling of the manufacturing process.

FIG. 10 is a view of the cooling of rubber in which alumina particles dispersed uniformly in rubber by kneading. The cooling method can be natural cooling or forced cooling. For example, if a symmetrical reduction of the distribution density of the particles toward the upper and the lower surface from the central part of the structure is required, it can be realized by interposing the rubber material from upper and lower side with the materials which have the same thermal conductivity. If the density distribution at the static state is required to become higher toward the tire center, this can be realized by cooling by using materials with higher thermal conductivity with respect to a surface which becomes a tire outer side.

FIG. 10 (a) shows the density distribution of alumina particles before cooling and FIG. 10 (b) shows the density distribution of alumina particles after cooling. Additionally, when cooling is performed, it is desirable to make the rubber in which alumina particles are dispersed uniformly into sheet form in order to facilitate subsequent locating to the tire.

The density distribution of alumina particles is uniform throughout the material before cooling. The rubber material with alumina particles dispersed will be cured from the section further from the central part of the layer by being cooled down from each surface. By being cooled down progressively from each surface, the alumina particles which were uniformly dispersed at the beginning will be pushed to the center of the layer which is softer. As a result, the density distribution of the alumina particles at the end of cooling will decrease toward the upper and the lower surface from the central part of the layer. This way, a laminated structure which is composed with a dilantant layer, where the particles are arranged so that the density distribution of the particles decreases toward the upper and the lower surface from the central part of the layer, will be manufactured.

The laminated structure pressurizing step (S0820) is a process as follows:

Since this laminated structure is formed into a sheet, it is possible for it to be placed into the inside of the tire the tire together with non-vulcanized tire material during the tire manufacturing process. At the same time, this sheet can be a part of the structure of inner liner 17 which is a component of a tire. For this laminated structure pressurizing step, a green tire which has the laminated structure described above placed among layers of the tire intermediate structure will be formed. This green tire is then put into the tire mold and vulcanized normally. During this vulcanization process, heating and pressurization of the tire is performed to vulcanize the tire, and as a result, the tire with laminated structure disposed (bonded) will be completed. Thereby, a tire with practical structure to absorb tire vibration can be manufactured.

Applied Manufacturing Method

Figure 11:
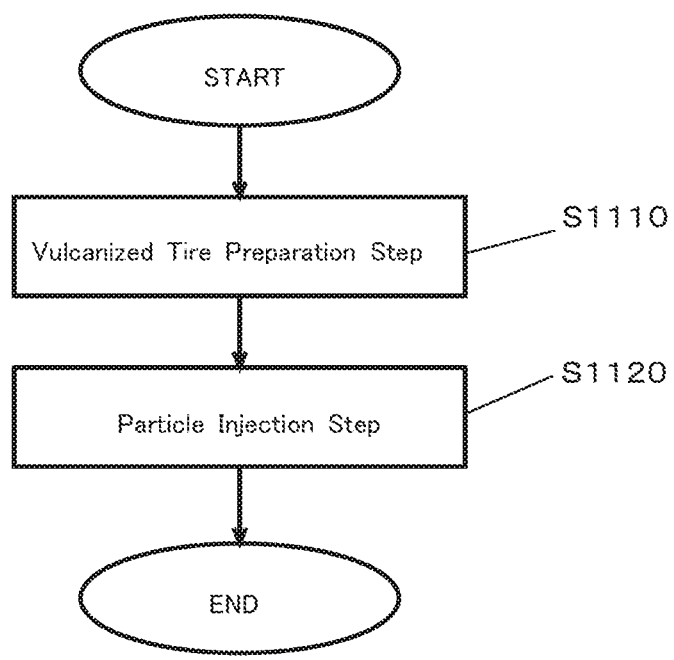
FIG. 11 is a flow chart of the applied manufacturing method.

The applied manufacturing method is described below using alumina particles as an exemplary material. FIG. 11 is the flow chart to show the procedure of the applied manufacturing method.

At first, prepare a vulcanized tire. (Vulcanized tire preparation step. S1110)

This starting point is the difference from the basic manufacturing method.

Alumina particles heated to 300-400 C are injected at high speed using a high pressure gas into the inner tire structure opposite the tread surface or directly into the outer tire tread surface. (Particle injection step, S1120.) By this procedure, a particle will bore a hole in the tire structure by melting tire rubber with the heat and kinetic energy of the particle. The resulting hole will be sealed by molten rubber after the alumina particle passes through the tire rubber. Afterwards, the tire surface section will mainly consist of the former rubber and molten rubber material which covered holes so that it should have less alumina particle density.

Figure 12:
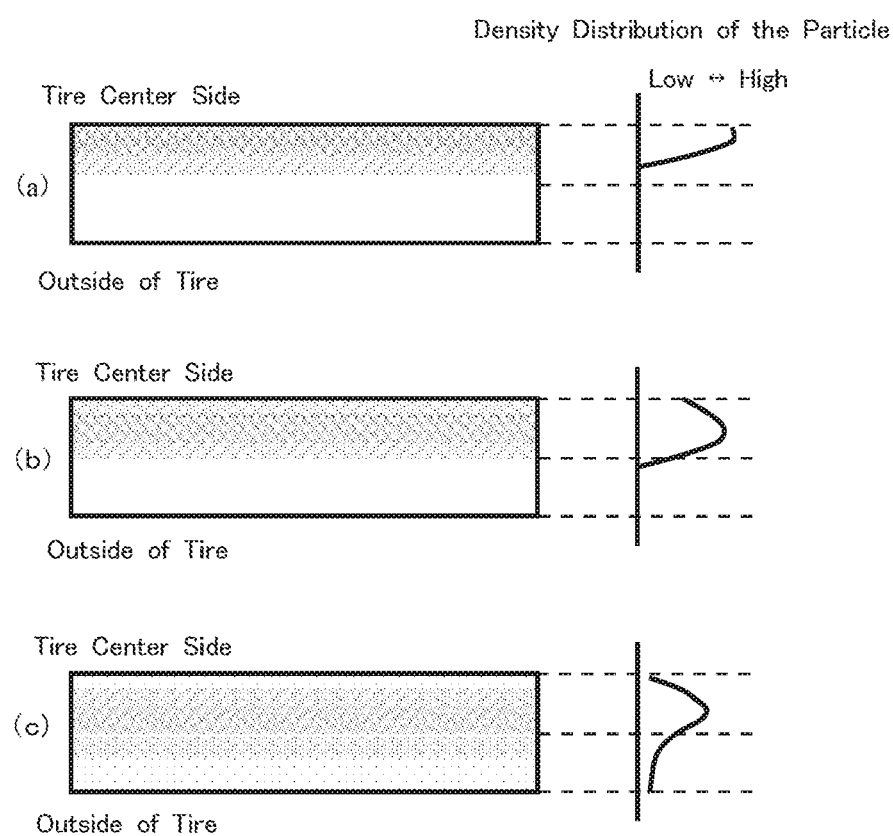
FIG. 12 is a drawing which shows the cooling process of the tire manufactured by the applied manufacturing method

To uniformly inject particles across the surface of the tire, a nozzle or nozzles spray particles onto the surface of a spun tire. It is possible to adjust the arrangement of the particles by adjusting injection quantities, nozzle angles, injection speeds, or by providing multiple nozzles, or by injecting heated gas at the end so as to provide a proper layer structure FIG. 12 is showing sectional view of the progress of forming the tire according to the present disclosure by the applied manufacturing method. The timeline progresses as (a), (b), (c). At first, the density of the alumina particles are highest at the section closer to central part of tire right after high speed injection of alumina particles heated to 300-400 C to the tire inner surface. Then, the section of higher alumina particle density slides to tire outer section progressively. Finally, the alumina particles disperse to form the laminated structure including the dilantant layer with optimal density distribution to exert an effect under a load from centrifugal force. At this case, it would be appropriate to regard the laminated structure section as the depth the injected alumina particle penetrates.

Effect

By the present embodiment, it is possible to provide the tire with reduced vibration which has the feature to attain different reaction speeds within the laminated structure. Therefore, it can provide a tire with reduced vibration without harming smooth deformation while disposing a laminated structure which was composed only with a dilantant layer. At the same time, it reduces tire noise caused by vibration. Furthermore, the tire according to the present embodiment can be manufactured by just mounting parts made of lighter weight and lower cost materials in a simple way compared to conventional techniques.

Embodiment 2

The tire of this embodiment is basically the same as the embodiment 1, but it is characterized in that the tire of this embodiment further includes a binder layer(s) with elasticity on an upper and/or a lower stratum of the dilantant layer, and the binder layer(s) bonds said dilantant layer to other member(s) so as to protect said dilantant layer. With this configuration, it is possible to better protect the dilantant layer structure. Also, this configuration can further improve vibration reduction effect.

Composition

Figure 13:
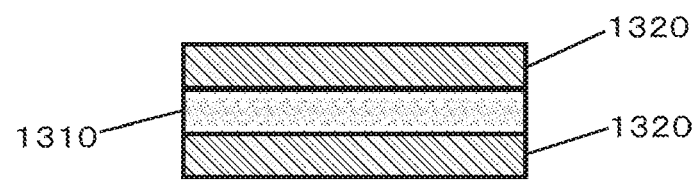
FIG. 13 is a concept view showing example composition of the laminated structure of embodiment 2.

FIG. 13 is a concept view which shows exemplary composition of the laminated structure of the present embodiment. In this example, the laminated structure is composed with one dilantant layer (1310) and two binder layers (1320). The dilantant layer is the same as the embodiment 1. Following is a description of binder layers.

Binder layer (1320) means the layer for bonding said dilantant layer to other member(s) at its upper and/or lower stratum. At this point, the other member(s) can be another dilantant layer or a composite of multiple dilantant layers. This enables better protection of the dilantant layer compared to the case not using the binder layer. Therefore, it is possible to keep the structure even with substantial tire deformation and it is less likely to be damaged.

The material for the binder layer should be an elastic material similar to the binder constituting the dilantant layer. To provide stabilization to the dilantant layer, it is necessary to have adequate viscosity and/or adhesiveness that can be provided by materials such as paint, rubber, adhesive, glue or tape (composite material made of base material and glue or adhesive). It is possible to use the same materials either, but not limited to these.

Regardless of the material variance of similar binding layers, it improves the vibration reduction effect by the friction of the border formed between dilantant layer and binder layer(s). (Other criteria are average density difference and different deformation characteristics.)

For example, with a binder layer of a different material than the binder of the dilantant layer, frictional damping will occur in between adjacent layers which have different material properties during deformation. As a result, it damps and reduces vibration.

Also, a border can be substantially formed between the dilantant layer and the latter attached binder layer even if the material of binder layer and binder of dilantant layer are the same. This is because the properties of the binder at the surface can shift by reacting with air during dilantant layer formation and binder layer disposition. With this case, it is possible to provide the vibration reduction effect by the frictional damping, as the different material combination even though the material of the binder layer and binder of dilantant layer are the same.

Same as the embodiment 1, during road driving, the dilantant layer without deformation at road contact transforms the kinetic energy of the particles to thermal energy while particles within dilantant layer rub each other as it acts as liquid under centrifugal force load. Additionally, by binder layer being disposed, the transformation to thermal energy happens while the dilantant layer and the binder layer are rubbing each other. Therefore, more of the vibration transmitting tire structure and of the air cavity resonance will be absorbed.

Manufacturing Method

Figure 14:
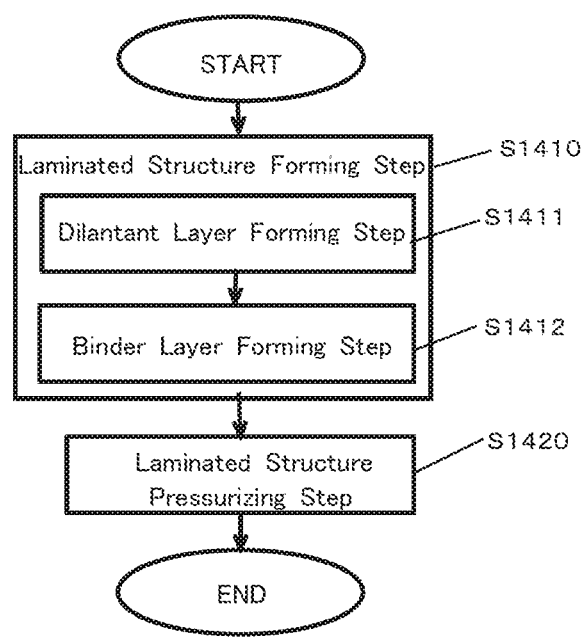
FIG. 14 is a flow chart of the manufacturing method of embodiment 2.

The manufacturing method of this embodiment is basically same as embodiment 1 except the creation of the binder layer. FIG. 14 is the flow chart of an exemplary manufacturing process of the present embodiment. First of all, form the laminated structure including a dilantant layer(s), which is a layer where particles and binder are arranged to act as a dilantant (Laminated structure forming step, S1410). Second, dispose the laminated structure to tire inner surface or to the tire section close to inner surface by heating and pressurization procedure (Laminated structure pressurizing step, S1420). For the present embodiment, Laminated structure forming step (S1419) includes the dilantant layer forming step (S1411) and additional step to overlay the binder layer (Binder layer forming step, S1412).

However, it is possible to additionally overlay a binder layer which has the same material as the binder of dilantant layer, and it is also possible to form a binder layer by modify the outmost surface of the dilantant layer. An example is changing the molecular binding characteristics or the physical properties, instead of additionally overlaying a binder layer, by injecting some chemicals or applying ultraviolet ray.

At the present embodiment, the integrity of particles and binder in the dilantant layer or of particles one another at an intermediate of the process can be weak because the dilantant layer is protected and covered by the binder layer(s). For example, it is possible to choose a particle which is covered by a polymer compound which will be binder only when reacting to heat and pressure. The particles which have this kind of covering will be protected by a thin raw rubber sheet which will become a binder layer during the tire manufacturing process, and it can form the dilantant layer, which works as a dilantant material, in tire structure after vulcanization.

It is possible to locate the laminated structure within an inner liner 17, which is an element of tire structure.

The laminated structure pressurizing step (S1420) of the present embodiment is basically same as the laminated structure pressurization step of the embodiment 1. However, the binder layer is newly added in the present embodiment, which the following description include its addition. As written at previous embodiment description, form a green tire composed with the laminated structure by disposing the laminated structure, which formed at above the laminated structure forming step, into the tire intermediate structure. Then, place this green tire into the mold and perform the vulcanization process. During this vulcanization process, heating and pressurization is done and material will be vulcanized. As a result, a tire which has the laminated structure disposed (stabilized) inside will be attained. At this moment, the laminated structure will be composed with a dilantant layer, in which the particles are dispersing into binder, and with the dilantant layer and binder layer being structured to layers in above said condition by reacting to heat and pressure.

Effect

The tire of this embodiment is possible to more effectively protect the dilantant layer by adding a binder layer(s), which is an elastic layer(s) that is to bond said dilantant layer to the other member(s) and that is to protect said dilantant layer, at the upper and/or the lower stratum of the dilantant layer. By adding this feature, it is possible to give a better vibration reduction. Also, a greater reduction of tire noise can be achieved.

What is claimed is:

1. A tire comprising:
a tire base having an inner surface; and
a dilantant layer that is disposed on the inner surface of the tire base, the dilantant layer being configured by a single sheet having outer surfaces, the single sheet being a kneaded mixture of a binding material and particles,
wherein a distribution density of the particles in the dilantant layer decreases in a radial direction from a maximum density proximate a center of the dilantant layer to a minimum density along the outer surfaces of the dilantant layer,
the distribution density of the particles is asymmetric from the outer surfaces of the dilantant layer relative to the center of the dilantant layer.

2. The tire according to claim 1, further comprising:
an elastic protection layer that is bonded on at least one of the outer surfaces of the dilantant layer.

3. The tire according to claim 2,
wherein the inner surface of the tire base, on which the dilantant layer is disposed, is located adjacent to a tread of the tire.

4. The tire according to claim 2,
wherein the particles are inorganic oxide particles, and a particle diameter of the particles is in a range of 1 μm to 10 μm.

5. The tire according to claim 4,
wherein a specific gravity of the dilantant layer is in a range of 1.5 to 3.0.

6. The tire according to claim 2,
wherein the binding material is rubber.

7. The tire according to claim 2,
wherein a specific gravity of the dilantant layer is in a range of 1.5 to 3.0.

8. The tire according to claim 2,
wherein a ratio of a thickness of the dilantant layer with respect to a thickness of a tread of the tire is in a range of 1/100 to 1/10.

9. The tire according to claim 1,
wherein the inner surface of the tire base, on which the dilantant layer is disposed, is located adjacent to a tread of the tire.

10. The tire according to claim 1,
wherein the particles are inorganic oxide particles, and a particle diameter of the particles is in a range of 1 μm to 10 μm.

11. The tire according to claim 10,
wherein a specific gravity of the dilantant layer is in a range of 1.5 to 3.0.

12. The tire according to claim 1,
wherein the binding material is rubber.

13. The tire according to claim 1,
wherein a specific gravity of the dilantant layer is in a range of 1.5 to 3.0.

14. The tire according to claim 1,
wherein a ratio of a thickness of the dilantant layer with respect to a thickness of a tread of the tire is in a range of 1/100 to 1/10.

15. The tire according to claim 1 wherein the maximum density is along the center of the dilantant layer.

16. The tire according to claim 1 wherein the dilantant layer has a cross sectional difference in dilantancy reaction speed.

17. The tire according to claim 1 wherein a dilantancy reaction speed of the dilantant layer progressively increases from a minimum reaction speed at the outer surfaces of the dilantant layer to a maximum reaction speed proximate the center of the dilantant layer.

18. The tire according to claim 1 wherein a viscosity of the dilantant layer progressively increases from a maximum viscosity proximate the center of the dilantant layer to a minimum viscosity at the radially inward and outward facing outer surfaces of the dilantant layer.

19. A tire comprising:
a tire base having an inner surface; and
a dilantant layer that is disposed on the inner surface of the tire base, the dilantant layer being configured by a single sheet having outer surfaces, the single sheet being a kneaded mixture of a binding material and particles, wherein a distribution density of the particles in the dilantant layer decreases in a radial direction from a maximum density proximate a center of the dilantant layer to a minimum density along the outer surfaces of the dilantant layer, wherein the distribution density further comprises:
  a first distribution density having a first drop rate from the center of the dilantant layer toward the radially inward facing outer surface of the dilantant layer,
  a second distribution density having a second drop rate from the center of the dilantant layer toward the radially outward facing outer surface of the dilantant layer, and
  the first drop rate of the first density distribution is greater than the second drop rate of the second density distribution in a static state of the tire.

\* \* \* \* \*